(12) United States Patent
He (10) Patent No.: US 12,386,737 B2
(45) Date of Patent: Aug. 12, 2025

(54) ELECTRONIC DEVICES AND MEMORY SYSTEMS HAVING A POWER CONTROL FUNCTION, AND POWER CONTROL METHODS

(71) Applicant: YANGTZE MEMORY TECHNOLOGIES CO., LTD., Wuhan (CN)

(72) Inventor: Youxin He, Wuhan (CN)

(73) Assignee: YANGTZE MEMORY TECHNOLOGIES CO., LTD., Wuhan (CN)

(*) Notice: Subject to any disclaimer, the term of this patent is extended or adjusted under 35 U.S.C. 154(b) by 0 days.

(21) Appl. No.: 18/392,682

(22) Filed: Dec. 21, 2023

(65) Prior Publication Data

US 2025/0094331 A1    Mar. 20, 2025

Related U.S. Application Data

(63) Continuation of application No. PCT/CN2023/119474, filed on Sep. 18, 2023.

(51) Int. Cl.
*G06F 12/02* (2006.01)
(52) U.S. Cl.
CPC ................. *G06F 12/0246* (2013.01)
(58) Field of Classification Search
CPC .................................................. G06F 12/0246
See application file for complete search history.

(56) References Cited

U.S. PATENT DOCUMENTS

| | | | |
|---|---|---|---|
| 2020/0042238 A1 | 2/2020 | Jung et al. | |
| 2020/0225721 A1 | 7/2020 | Yu et al. | |
| 2022/0199192 A1 | 6/2022 | Binfet et al. | |
| 2022/0413583 A1 | 12/2022 | Hassan et al. | |
| 2023/0152989 A1* | 5/2023 | Kim | G06F 1/3225 |
| | | | 711/142 |
| 2024/0311010 A1* | 9/2024 | Fujimoto | G06F 3/0634 |
| 2024/0427504 A1* | 12/2024 | Kim | G11C 5/141 |

FOREIGN PATENT DOCUMENTS

| | | |
|---|---|---|
| CN | 106484318 A | 3/2017 |
| CN | 111382097 A | 7/2020 |
| CN | 113257324 A | 8/2021 |
| CN | 115708042 A | 2/2023 |
| TW | 202219698 A | 5/2022 |

* cited by examiner

*Primary Examiner* — Tasnima Matin
(74) *Attorney, Agent, or Firm* — BAYES PLLC (57) ABSTRACT

The present disclosure discloses an electronic device, a memory system and a power control method, which belong to the field of storage technology. A disclosed electronic device can comprise a host and a memory system. The host can comprise a power management unit, and a first interface configured to send an identifier indicating a peak power capability supported by the power management unit. The memory system can comprise at least one memory device coupled with the host, a second interface communicated with the first interface and configured to receive the identifier, and a memory controller coupled the memory device and configured to determine a peak power management policy matches the peak power capability according to the identifier.

20 Claims, 7 Drawing Sheets

ELECTRONIC DEVICES AND MEMORY SYSTEMS HAVING A POWER CONTROL FUNCTION, AND POWER CONTROL METHODS

CROSS-REFERENCE TO RELATED APPLICATIONS

This application is a continuation of International Application No. PCT/CN2023/119474, filed on Sep. 18, 2023, which is incorporated herein by reference in its entirety.

FIELD OF TECHNOLOGY

The present disclosure relates to the field of storage technology, in particular to electronic devices, memory systems, and power control methods.

BACKGROUND

The hardware system corresponding to some electronic devices (e.g., a mobile phone, a tablet) may include a host and a memory system. Among them, the host may supply power to the memory system, and the maximum power supplied may be referred to as peak power.

In order to ensure the normal operation of the power management unit and memory system, it is generally required that the operating power of the memory system does not exceed the peak power supported by the host.

However, the peak power supported by the host on the market is not consistent, thus memory manufacturers generally limit the operating power of memory systems so that the memory systems provided may adapt to more hosts on the market.

SUMMARY

An example of the present disclosure provides a host, system and control method, a memory system included in the system is capable to sense the peak power capability supported by the host, and determine an appropriate peak power management policy according to the sensed peak power capability, so that the full storage performance of the memory system can be reached. The technical scheme is as follows:

In a first aspect, a system is provided, including a host and a memory system, the host is equipped with a first interface, the memory system includes a memory controller, the memory controller is equipped with a second interface, the host and the memory system are coupled through the first interface and the second interface and implement interaction of information. The host is configured to send an identifier indicating a peak power capability supported by the host through the first interface. The memory controller is configured to receive the identifier through the second interface and determine a peak power management policy according to the received identifier.

In some implementations, the host includes a power management unit, the power management unit is to supply power to the memory system, and the identifier described above is to indicate the peak power capability supported by the power management unit.

In some implementations, the identifier described above is to indicate the magnitude of current that the power management unit is capable of providing to the memory system according to the supported peak power capability.

In some implementations, the current that the power management unit is capable to provide to the memory system according to the supported peak power capability includes at least one of Icc or Iccq.

In some implementations, a default peak power management policy is set in the memory controller. The memory controller is configured to replace the default peak power management policy with the determined peak power management policy after determining the peak power management policy.

In some implementations, the peak power management policy includes parameters that control the running of the memory system.

In some implementations, the parameters in the peak power management policy include at least one of clock frequency, parallelism of flash memory NAND, and operation latency of an I/O request.

In some implementations, the memory system includes a flash universal storage UFS memory system, and the first interface and the second interface include UFS interfaces.

In some implementations, the identifier is carried in an extended field of the UFS data packet.

In some implementations, the power management unit includes a power management chip PMIC.

In some implementations, the memory controller is further configured to send a response message through the second interface after receiving the identifier, the response message is to indicate that the identifier has been received by the memory controller. The host is further configured to receive the response message through the first interface.

In some implementations, the host is further configured to send an I/O request through the first interface. The memory controller is further configured to receive the I/O request through the second interface and control the memory to process the I/O request according to the determined peak power management policy.

In a second aspect, a host is provided, the host is equipped with a first interface, and the host is coupled with a second interface of a memory controller in a memory system through the first interface to implement interaction of information.

The host is configured to send an identifier to the second interface of the memory controller through the first interface, the identifier is to indicate the peak power capability supported by the host; and receive a response message sent by the memory controller through the first interface, the response message is to indicate that the identifier has been received by the memory controller.

In some implementations, the host includes a power management unit, the power management unit is to supply power to the memory system, and the identifier described above is to indicate the peak power capability supported by the power management unit.

In some implementations, the identifier described above is to indicate the magnitude of current that the power management unit is capable of providing to the memory system according to the supported peak power capability.

In some implementations, the current that the power management unit is capable to provide to the memory system according to the supported peak power capability includes at least one of Icc or Iccq.

In some implementations, the host is further configured to send the I/O request to the second interface of the memory controller through the first interface.

In some implementations, the memory system includes a flash universal storage UFS memory system, the first interface includes a UFS interface, and the identifier is carried in an extended field of the UFS data packet.

In some implementations, the power management unit includes a power management chip PMIC.

In a third aspect, a memory system is provided, the memory system includes a memory controller and a memory, the memory controller is equipped with a second interface, the memory controller is coupled with a first interface of a host through the second interface to implement interaction of information.

The memory controller is configured to receive, through the second interface, an identifier which is sent by the host through the first interface and indicates a peak power capability supported by the host, and determine a peak power management policy according to the identifier.

The memory controller is configured to control the memory to process an I/O request according to the determined peak power management policy.

In some implementations, a default peak power management policy is set in the memory controller. The memory controller is configured to replace the default peak power management policy with the determined peak power management policy after determining the peak power management policy.

In some implementations, the peak power management policy includes parameters that control the running of the memory system.

In some implementations, the parameters include at least one of clock frequency, parallelism of flash memory NAND, and operation latency of an I/O request.

In some implementations, the memory system includes a flash universal storage UFS memory system, the second interface includes a UFS interface, and the identifier is carried in an extended field of the UFS data packet.

In some implementations, the memory controller is further configured to send a response message through the second interface after receiving the identifier described above, the response message is to indicate that the identifier has been received by the memory controller.

In a fourth aspect, a control method for a system is provided, the system includes a host and a memory system, the host is equipped with a first interface, the memory system includes a memory controller, the memory controller is equipped with a second interface, the host and the memory system are coupled through the first interface and the second interface and implement interaction of information, the control method includes: sending, by the host, an identifier which is to indicate a peak power capability supported by the host through the first interface. By the memory controller, receiving the identifier through the second interface, and determining a peak power management policy that matches the peak power capability according to the identifier.

In some implementations, the host includes a power management unit, the power management unit is to supply power to the memory system, and the identifier is to indicate the peak power capability supported by the power management unit.

In some implementations, the identifier indicates the magnitude of current that the power management unit is capable of providing to the memory system according to the supported peak power capability.

In some implementations, the current that the power management unit is capable to provide to the memory system according to the supported peak power capability includes at least one of Icc or Iccq.

In some implementations, a default peak power management policy is set in the memory controller. The control method described above further includes replacing, by the memory controller, the default peak power management policy with the determined peak power management policy after determining the peak power management policy.

In some implementations, the peak power management policy includes parameters that control the running of the memory system.

In some implementations, the parameters include at least one of clock frequency, parallelism of flash memory NAND, and operation latency of an I/O request.

In some implementations, the memory system includes a flash universal storage UFS memory system, and the first interface and the second interface include UFS interfaces.

In some implementations, the identifier is carried in an extended field of the UFS data packet.

In some implementations, the power management unit includes a power management chip PMIC.

In some implementations, the control method described above further includes sending, by the memory controller, a response message through the second interface after receiving the identifier, the response message is to indicate that the identifier has been received by the memory controller. The host receives the response message through the first interface.

In some implementations, the control method described above further includes sending, by the host, an I/O request through the first interface. The memory controller receives the I/O request through the second interface and controls the memory to process the I/O request according to the determined peak power management policy.

The beneficial effects brought by the technical solutions provided by examples of the present disclosure can include after interaction of information is established between the host and the memory controller of the memory system through interfaces, the host may send an identifier corresponding to the supported peak power capability to the memory controller. The memory controller may determine a peak power management policy that matches the peak power capability of the host according to the received identifier, and then process the I/O request according to the determined peak power management policy. Thus, the memory controller is capable to adjust the peak power management policy according to the peak power capability of the host, without limiting the storage performance of the memory system in advance, so that the full performance of the memory system can be utilized.

BRIEF DESCRIPTION OF THE DRAWINGS

In order to more clearly illustrate the technical solutions in the examples of the present disclosure, the accompanying drawings that need to be used in the description of the examples will be briefly introduced below, and apparently, the accompanying drawings in the following description are only some examples of the application, and for those skilled in the art, other drawings may also be obtained according to these accompanying drawings without any creative effort.

DETAILED DESCRIPTION

In order to make the purpose, technical solution and advantages of the present disclosure clearer, implementations of the present disclosure will be further described in detail below in conjunction with the accompanying drawings.

Figure 1:
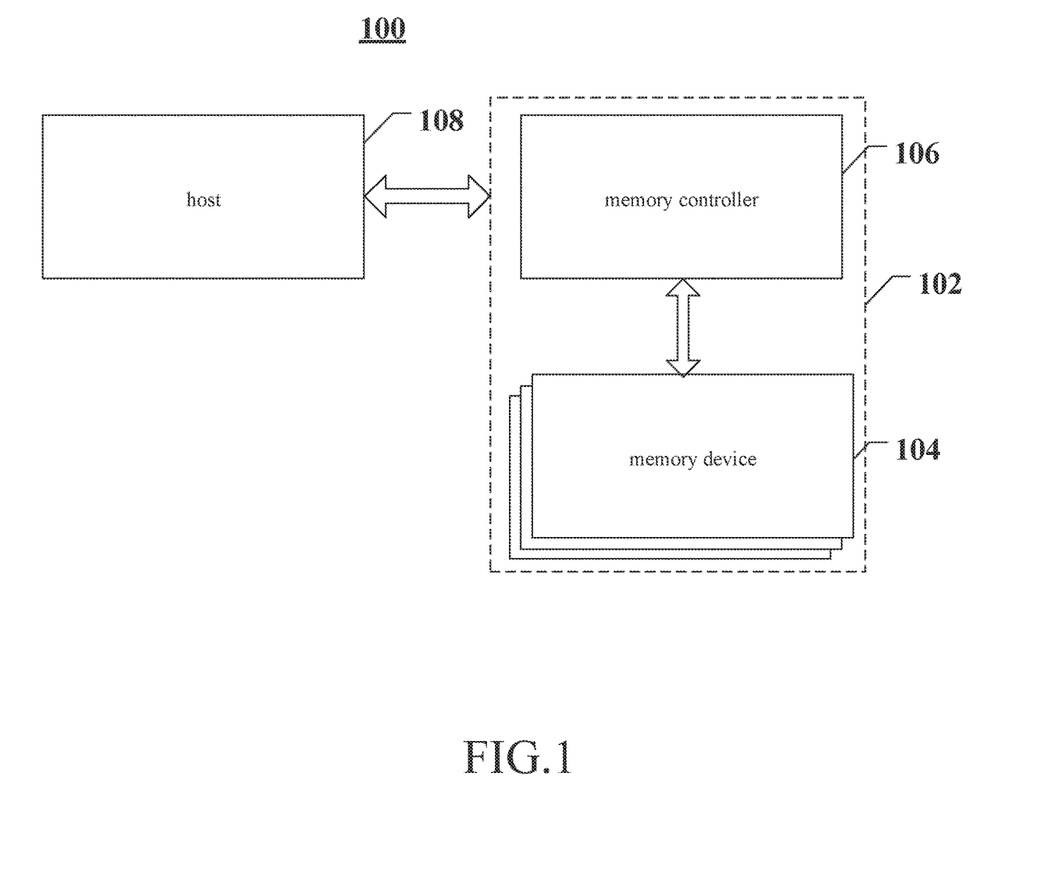
FIG. 1 is a schematic diagram of an illustrated system provided by an example of the present disclosure.

FIG. 1 shows a block diagram of an illustrated system 100 with a memory system in accordance with some aspects of the present disclosure. The system 100 may be a mobile phone, a desktop computer, a laptop computer, a Tablet, a vehicle computer, a gaming console, a printer, a positioning device, a wearable electronic device, a smart sensor, a virtual reality (VR) device, an argument reality (AR) device, or any other suitable electronic devices having memory device therein. As shown in in FIG. 1, the system 100 may include a host 108 and a memory system 102, and the memory system 102 has one or more memories 104 and a memory controller 106. The host 108 may be a processor of an electronic device (e.g., a central processing unit (CPU)) or a system on chip (SoC) (e.g., an Application Processor (AP)). Host 108 may be configured to send data to or receive data from memory 104.

The memory 104 may be any memory device disclosed in the present disclosure. In some implementations, the memory 104 is a NAND flash memory device, e.g., a three-dimensional (3D) NAND flash memory device.

In some implementations, the memory controller 106 is coupled to the memory 104 and the host 108 and is configured to control the memory 104. The memory controller 106 may manage data stored in the memory 104 and communicate with the host 108. In some implementations, the memory controller 106 is designed to operate in low duty cycle environments, e.g., Secure Digital (SD) card, Compact Flash (CF) card, Universal Serial Bus (USB) flash drive, or other media for use in electronic devices such as personal computer, digital camera, mobile phone, etc. In some implementations, the memory controller 106 is designed to operate in high duty cycle environments such as SSD or embedded multimedia card (eMMC), where SSDs or eMMCs are used as data storage for mobile devices such as smartphone, Tablet computer, laptop computer, and enterprise storage array. The memory controller 106 may be configured to control operations of memory 104, e.g., read, erase and program processing. The memory controller 106 may also be configured to manage various functions related to data stored or to be stored in memory 104, including but not limited to bad block management, garbage collection, logical-to-physical address translation, wear leveling, etc. In some implementations, the memory controller 106 is also configured to process error correction code (ECC) related to data read from or written to memory 104. The memory controller 106 may also perform any other suitable functions, e.g., formatting memory 104. The memory controller 106 may communicate with external devices (e.g., host 108) according to a particular communication protocol. For example, the memory controller 106 may communicate with an external device through at least one of various interface protocols, e.g., USB protocol, MMC protocol, Peripheral Component Interconnect (PCI) protocol, PCI Express (PCI-E) protocol, advanced Technology Attachment (ATA) protocol, Serial ATA protocol, Parallel ATA protocol, Small Computer Small Interface (SCSI) protocol, Enhanced Small Disk Interface (ESDI) protocol, Integrated Drive Electronics (IDE) protocol, Firewire protocol, etc.

Figure 2:
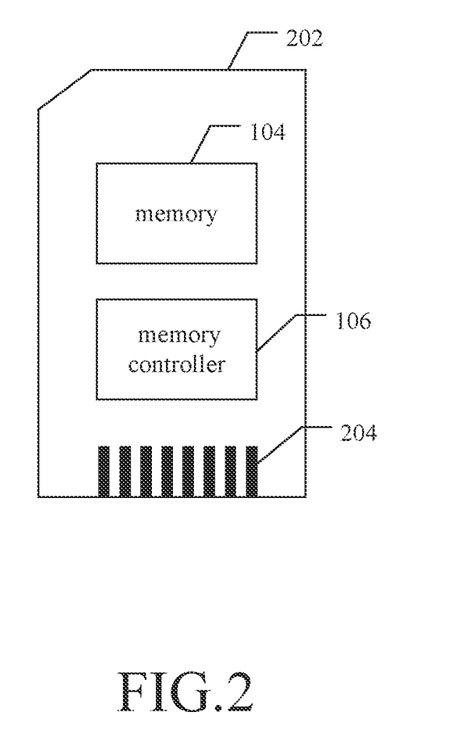
FIG. 2 is a diagram of an illustrated memory card provided by an example of the present disclosure.
Figure 3:
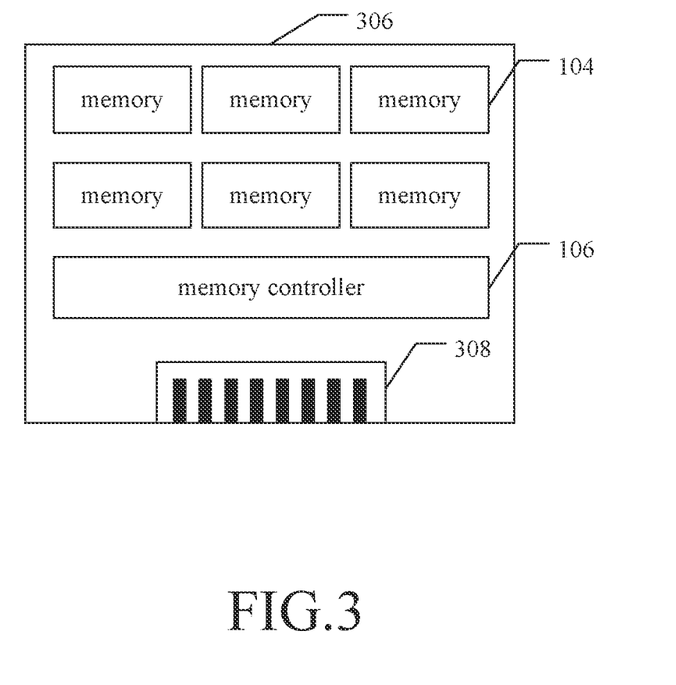
FIG. 3 is a schematic diagram of an illustrated solid-state drive provided by an example of the present disclosure.

The memory controller 106 and one or more memories 104 may be integrated into various types of storage devices, e.g., included in the same package (e.g., Universal Flash Storage (UFS) package or eMMC package). That is, the memory system 102 may be implemented and packaged into different types of end electronic products. In some implementations as shown in FIG. 2, the memory controller 106 and the single memory device 104 may be integrated into a memory card 202. The memory card 202 may include a PC card (PCMCIA, personal computer memory card international association), a CF card, a smart media (SM) card, a memory stick, a multimedia card (MMC, RS-MMC, MMC-micro), an SD card (SD, miniSD, microSD, SDHC), a UFS, etc. Memory card 202 may further include a memory card connector 24 coupling memory card 202 with a host (e.g., host 108 in FIG. 1). In another example as shown in FIG. 3, the memory controller 20 and multiple memory devices may be integrated into a SSD 306. SSD 306 may further include an SSD connector 308 coupling SSD 306 with a host (e.g., host 108 in FIG. 1). In some implementations, at least one of the storage capacity or operating speed of SSD 306 is greater than at least one of the storage capacity or operating speed of memory card 202.

Host 108 in system 100 may provide power to memory system 102. In an example shown in FIG. 4, the host 108 may include a PMU (Power Management Unit) 402. The PMU 402 may supply power to the memory 104 and memory controller 106 respectively. The voltage and current provided by the PMU 402 to the memory 104 are Vcc and Icc, respectively, and the voltage and current provided by the PMU 402 to the memory controller 106 are Vccq and Iccq, respectively. The maximum magnitude of power that the PMU 402 supplies to the memory 104 may be referred to as peak power. During operation, the memory system 102 requires that the power it requires does not exceed the peak power supported by the host (or PMU).

In some implementations, the peak powers supported by the hosts 108 provided by different host manufacturers are not consistent, therefore, in order to improve the adaptability of the memory system 102, memory manufacturers generally limit the operating power of the memory system 102 to below the peak power supported by most hosts 108 on the market. In some implementations, the peak power may be represented by the corresponding peak current, the peak power supported by the host 108 on the market may include 800 mA, 1A, and 1.2A, and memory manufacturers may limit the operating power of the memory system 102 to below 800 mA.

The operating power of the memory system 102 is directly related to the storage performance of the memory system 102, the limitation on the operating power is also achieved by limiting the storage performance of the memory system 102, e.g., through limiting the read and write rate of the memory system 102, the limitation on the operating power of the memory system 102 may be implemented. Thus, although the adaptability of the memory system 102 is improved, if the host 108 in the system 100 is capable to support a higher peak power, the memory system 102 is not capable to reach the full storage performance.

An example of the present disclosure provides a control method of a system, the system may be the system 100 shown in FIG. 1, including a host and a memory system. In this system, the memory system is capable to sense the peak power of the host, and then adjust the peak power management policy according to the sensed peak power, so that the full storage performance of the memory system may be reached.

Figure 5:
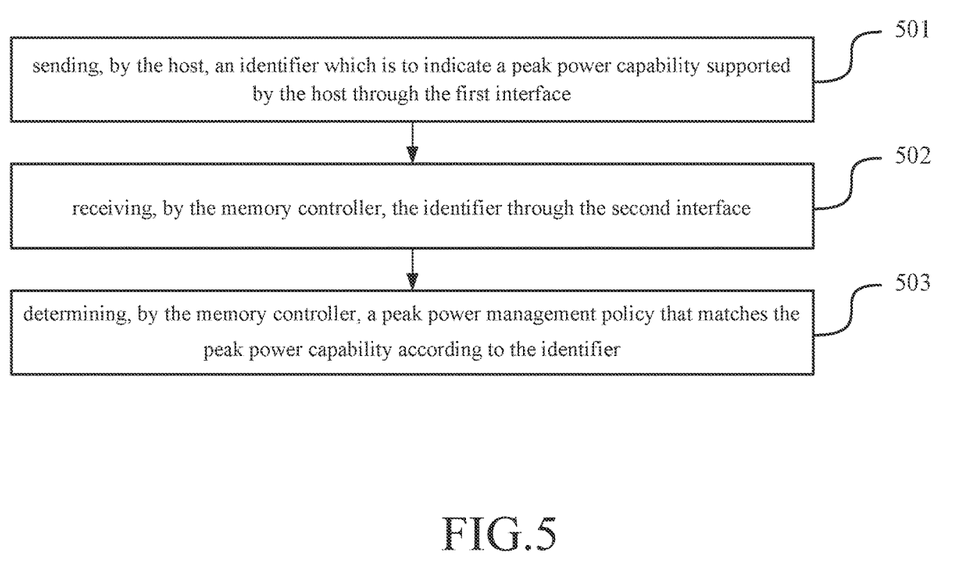
FIG. 5 is a flow chart of a control method for an illustrated system provided by an example of the present disclosure.
Figure 6:
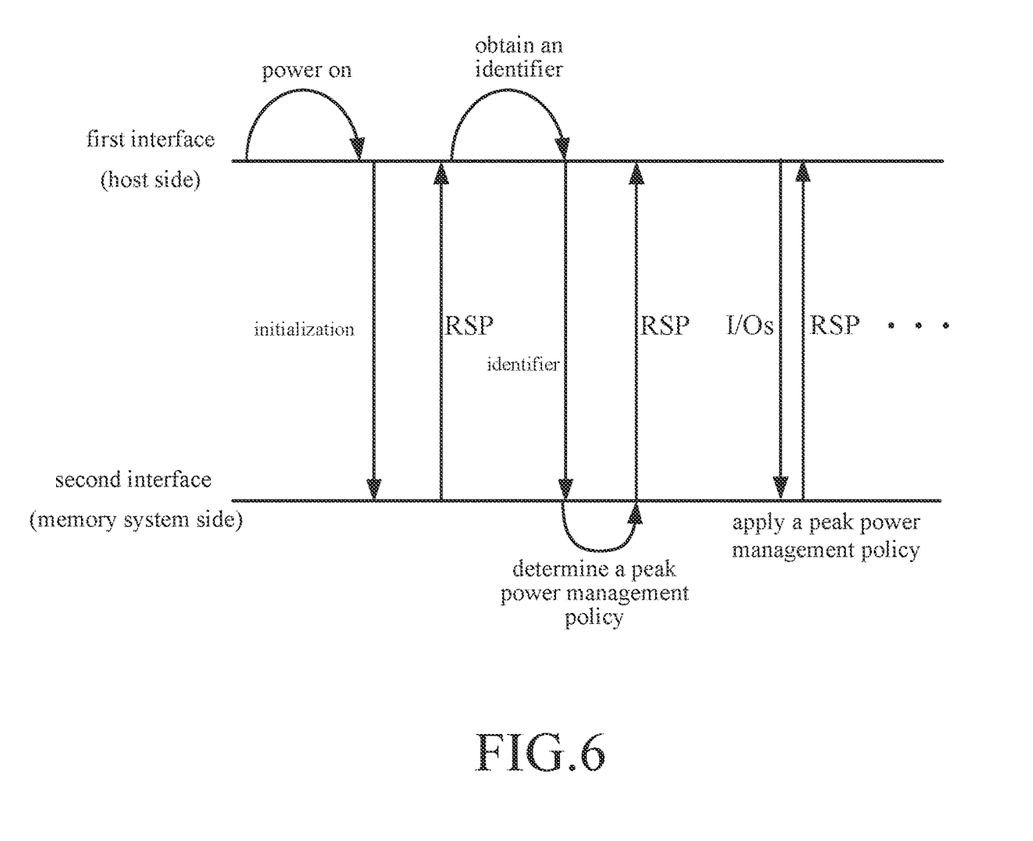
FIG. 6 is a flow chart of a control method for an illustrated system provided by an example of the present disclosure.

FIGS. 5 and 6 are flow charts of a control method of a system provided by an example of the present disclosure, as shown in FIG. 5 or FIG. 6, in the system provided by the example of the present disclosure, the host is equipped with a first interface, and the memory controller of the memory system is equipped with a second interface, the host and the memory system may be coupled through the first interface and the second interface and implement interaction of information.

Referring to FIG. 5, a control method of a system provided by an example of the present disclosure can include the following operations.

At Operation 501, the host can send an identifier indicating a peak power capability supported by the host through the first interface.

In an implementation, the identifier indicating the peak power capability supported by the host may be stored in the host, and the host may send the identifier to the second interface of the memory controller through the configured first interface.

At operation 502, the memory controller can receive the identifier through the second interface.

At Operation 503, the memory controller can determine a peak power management policy that matches the peak power capability according to the identifier.

In an implementation, the peak power management policy may be used to control the operating power of the memory system. In an example, the peak power management policy is to limit the write rate of the memory to achieve the effect of controlling the operating power of the memory system.

In an implementation, after receiving the identifier sent by the host, through the second interface configured to the memory controller, the memory controller may determine the peak power management policy corresponding to the received identifier from the correspondence relationship between the stored identifier and a peak power management policy, and then the determined peak power management policy may be used as the peak power management policy to be adopted during the running of the memory system.

In the correspondence relationship described above, a peak power management policy corresponding to an identifier matches the peak power capability indicated by the identifier. For example, the identifier "1h" indicates that the peak power supported by the host is 650 mA, and in the process of the memory system applying the peak power management policy corresponding to "1h", the occurred peak current may be less than and close to (or equal to) 650 mA. The identifier "2h" indicates that the peak power supported by the host is 800 mA, and in the process of the memory system applying the peak power management policy corresponding to "2h", the occurred peak current may be less than and close to (or equal to) 800 mA.

In a control method of the system provided in an example of the present disclosure, the host may send the peak power capability supported by the host to the memory system, and the memory controller in the memory system may dynamically match and apply an appropriate peak power management policy according to the peak power capability supported by the host. The example of the present disclosure avoids the memory system from setting a peak power management policy with low storage performance in order for matching with most hosts, and causes the memory system to reach the full storage performance when working with various hosts.

As shown in FIG. 6, the host in the system may send, through the first interface, an initialization instruction to the second interface of the memory controller after being powered on. After receiving the initialization instruction, the memory controller may perform the initialization operation and send an RSP (response message) to the host through the second interface. After receiving the RSP of the memory system for the first time through the first interface, the host may then send, through the first interface, an identifier which indicates the peak power capability supported by the host to the memory controller. After receiving through the second interface the identifier which is to indicate the peak power capability supported by the host, the memory controller may determine and apply the peak power management policy corresponding to the received identifier according to the stored correspondence relationships. After receiving the identifier, the memory controller may send an RSP to the host again through the second interface, the RSP which is sent for a second time is to indicate the identifier sent by the host is received by the memory controller.

Referring to FIG. 6, after the host receives the RSP sent by the memory controller through the first interface for the second time, and when a pending I/O (Input/Output) request is in the host, the host may send an I/O request to the memory controller through the first interface. The memory controller may control the memory to process the I/O request according to the determined peak power management policy after receiving the I/O request through the second interface. Thus, the memory system may process I/O requests according to the peak power management policy that matches the peak power capability of the host, which causes the memory system to reach full storage performance without exceeding the peak power of the host. Besides, since the memory system is capable to flexibly adjust a matching peak power management policy according to the peak power of the host, the memory system provided by an example of the present disclosure has a higher adaptability than that in some examples.

Figure 4:
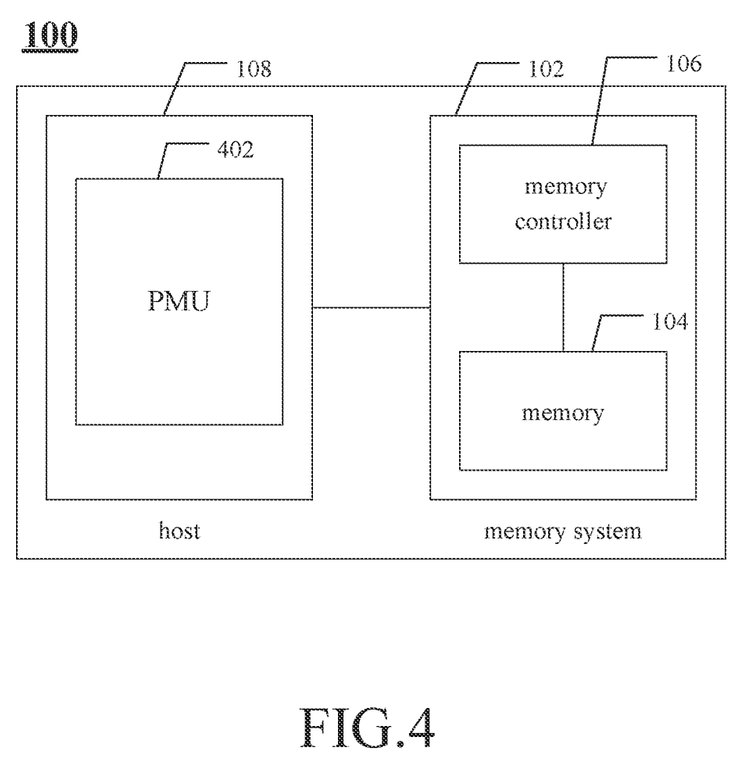
FIG. 4 is a schematic diagram of an illustrated system provided by an example of the present disclosure.

In the system shown in FIG. 4, the host may supply power to the memory system through the PMU, the PMU may be a control chip integrated in the host controller of the host, or it may be a control chip independent of the host controller. In an example, the PMU may include a Power Management Integrated Circuit (PMIC) independent of the host controller. Accordingly, the identifier used to indicate the peak power capability supported by the host in the example described above may be used to indicate the peak power capability supported by the PMU. Since the operating voltages provided by the PMU to the memory controller and memory are relatively stable during the running of the memory system, magnitude of the current provided by the PMU to the memory controller and memory may reflect the peak power capability of the PMU. Therefore, the identifier which is to indicate the peak power capability of the PMU described above may also be used to indicate the magnitude of current that the PMU is capable to provide to the memory system according to the supported peak power capability.

In an example, the peak power management policy described above includes at least one parameter that controls the running of the memory system. The at least one parameter may be used to control the write rate of the memory in the memory system, and in turn to control the operating power of the memory system, so that the operating power of the memory system is less than and close to (or equal to) the peak power supported by the host. Table 1 shows the relationship between the peak power capability supported by the host and the write rate of the memory, wherein the memory cell in the memory may be a triple-level (TLC).

TABLE 1

| Peak Power Capability | Write Rate of Memory |
|---|---|
| 800 mA | 650 MB/s |
| 1 A | 850 MB/s |
| 1.2 A | 1000 MB/s |

As shown in Table 1, when the peak power capability supported by the host is 800 mA, the write rate of memory may be controlled at 650 MB/s through the parameters in the peak power management policy, so that the operating power of the memory system does not exceed the peak power supported by the host.

In an example, at least one parameter included in the peak power management policy may include a clock frequency of a memory system, parallelism of flash memory NAND, and operation latency of an I/O request, etc. Wherein, the clock frequency refers to the clock frequency used by the memory system at run time, in an example, the higher the clock frequency is, the higher the write rate is, and the greater the corresponding operating power consumed by the memory system is. The parallelism of NAND refers to the number of NAND cells that perform write operations at the same time, in some implementations, the higher the parallelism is, the higher the writing rate is, and the greater the corresponding operating power consumed by the memory system is. The operation latency of an I/O request refers to the time interval between adjacent I/O requests to be processed by the memory controller, in some implementations, the shorter the operation latency is, the higher the write rate is, and the greater the corresponding operating power consumed by the memory system is.

In the correspondence relationship between the identifier and the peak power management policy described above, the values of the parameters included in the peak power management policy corresponding to each identifier may be configured based on actual needs. For example, the write rate that meets the limit required by the peak power capability may be used as the input of the configuration algorithm, and the configuration algorithm outputs the values of each of the parameters described above. It is noted that various suitable processes of the configuration algorithm may be used, which are not described in detail in the examples of the present disclosure.

In an implementation, after receiving the identifier which is to indicate the peak power capability and is sent by the host, the memory controller may determine the peak power management policy corresponding to the received identifier in the pre-stored correspondence relationships, then set the values of parameters for running the memory system to the values of parameters included in the peak power management policy. Thus, the write rate of the memory may be adjusted according to the peak power capability supported by the host, so that the full storage performance of the memory may be reached, and the operating power of the memory system does not exceed the peak power supported by the host.

Since the corresponding power consumption is relatively large when the memory performs a write operation, the control of the operating power of the memory system may be implemented through controlling the write rate. However, the example of the present disclosure is not limited to implementing control of the operating power of the memory system only through controlling the write rate. Similarly, in examples of the present disclosure, the parameters described above may also be adjusted to control the erase rate and read rate of the memory, thereby implementing further control of the operating power of the memory system.

In an example, the memory system provided by an example of the present disclosure may include a UFS memory system. Communications between the host and the memory system may be according to the UFS protocol. Accordingly, the first interface of the host and the second interface of the memory controller described above may both include UFS interfaces.

In an example of the present disclosure, the memory in the UFS memory system may be referred to as a UFS memory, and the memory controller in the UFS memory system may be referred to as a UFS memory controller. PMU may supply powers to UFS memory and UFS memory controller respectively. Wherein the voltage and the current provided by the PMU to the UFS memory are Vcc and Icc respectively, and the voltage and the current provided by the PMU to the UFS memory controller are Vccq and Iccq respectively. The Vcc and Vccq provided by the PMU to the UFS memory system are relatively stable. Therefore, the identifiers used for the peak power capability of the host may respectively represent the magnitude of Icc and Iccq respectively provided by the host to the UFS memory system with the peak power capability.

In some implementations, when the host sends identifiers which indicate the magnitudes of Icc and Iccq to the UFS memory controller through the UFS interface, the identifier may be carried in the UFS data packet. The identifier may be further added to the extended field of the UFS data packet. Table 2 shows the added information of Icc and Iccq in the UFS data packet extended field.

TABLE 2

| Size | Name | Value | User Conf. | Description |
|---|---|---|---|---|
| 1 | bHostIccqPeak Capability | FFh | Yes | 1 h: 650 mA<br>2 h: 800 mA<br>3 h: 1 A<br>4 h: 1.2 A<br>5 h: 1.4 A |
| 1 | bHostIccPeak Capability | FFh | Yes | 1 h: 650 mA<br>2 h: 800 mA<br>3 h: 1 A<br>4 h: 1.2 A<br>5 h: 1.4 A |

In Table 2, "Size" represents the number for the identifier which is to indicate the magnitude of the Iccq or Icc occupied in the extended field (e.g., 1 byte). "Name" represents the name of the identifier occupied in the extended field. "Value" represents the numerical type of the identifier, as shown in Table 2, the identifier described above may be a hexadecimal value. "User Conf." represents that the extended fields is to be pre-configured based on actual needs. "Description" shows the peak power capability of the host indicated by the identifier corresponding to Iccq or Icc when taking different values.

In an example, when sending the UFS data packet to the UFS memory controller, the host may only carry the identifier corresponding to Icc. Accordingly, in the correspondence relationship for the UFS memory controller, the correspondence relationships between different identifiers for Icc and peak power management policies may be stored.

In another example, when sending the UFS data packet to the UFS memory controller, the host may only carry identifiers corresponding to Icc and Iccq. Accordingly, in the correspondence relationships for the UFS memory controller, the correspondence relationships between different two identifiers for Icc and Iccq and peak power management policies may be stored.

In an example, a default peak power management policy is set in the memory controller. The default peak power management policy is capable of controlling the operating power of the memory system to meet the peak power capabilities supported by most hosts on the market. For example, the default peak power management policy is capable of controlling the operating power of the memory system to meet the peak power capabilities supported by more than a preset number of types of hosts.

Thus, in an aspect, even if the host does not have the ability to send an identifier which is to indicate the peak power capability to the memory controller, the memory controller may still control the running of the memory system with the default peak power management policy. In another aspect, even if the memory controller does not have the ability to find matched the peak power management policy according to the identifier sent by the host, the operation of sending the identifier to the memory controller by the host will not affect the normal operation of the memory controller.

An example of the present disclosure also provides a host, the host may include each of the hosts shown in FIG. 1, FIG. 4 to FIG. 6 described above. The host is equipped with a first interface, and the host is coupled with a second interface of a memory controller in a memory system through the first interface and to implement interaction of information.

The host is configured to send an identifier to the second interface of the memory controller through the first interface, the identifier is to indicate the peak power capability supported by the host; and receive a response message sent by the memory controller through the first interface, the response message is to indicate that the identifier has been received by the memory controller.

In some implementations, the host includes a power management unit, the power management unit is to supply power to the memory system, and the identifier is to indicate the peak power capability supported by the power management unit.

In some implementations, the identifier indicates the magnitude of current that the power management unit is capable of providing to the memory system according to the supported peak power capability.

In some implementations, the current that the power management unit is capable to provide to the memory system according to the supported peak power capability includes at least one of Icc or Iccq.

In some implementations, the host is further configured to send the I/O request to the second interface of the memory controller through the first interface.

In some implementations, the memory system includes a UFS memory system, the first interface includes a UFS interface, and the identifier is carried in an extended field of the UFS data packet.

In some implementations, the power management unit includes a power management chip PMIC.

The host provided by an example of the present disclosure may perform the operations performed by the host in the control method provided by an example of the present disclosure, the details of which may refer to the content of the examples described above and will not be repeated here.

The host provided by the example of the present disclosure is capable to actively send the peak power capability supported by the host to the memory system, which may cause the memory system to adjust the peak power management policy of the memory system according to the peak power capability supported by the host, so as to reach the full storage performance of the memory system.

An example of the present disclosure also provides a memory system, which may include each of the memory systems shown in FIGS. 1 to 4 described above. The memory system includes a memory controller and a memory, the memory controller is equipped with a second interface, the memory controller is coupled with the first interface of the host through the second interface to implement interaction of information.

The memory controller is configured to receive, through the second interface, an identifier which is sent by the host through the first interface and indicates a peak power capability supported by the host, and determine a peak power management policy according to the identifier.

The memory controller is configured to control the memory to process an I/O request according to the determined peak power management policy.

In some implementations, a default peak power management policy is set in the memory controller.

The memory controller is configured to replace the default peak power management policy with the determined peak power management policy after determining the peak power management policy.

In some implementations, the peak power management policy includes parameters that control the running of the memory system.

In some implementations, the parameters include at least one of clock frequency, parallelism of flash memory NAND, and operation latency of an I/O request.

In some implementations, the memory system includes a flash universal storage UFS memory system, the second interface includes a UFS interface, and the identifier is carried in an extended field of the UFS data packet.

In some implementations, the memory controller is further configured to send a response message through the second interface after receiving the identifier, the response message is to indicate that the identifier has been received by the memory controller.

The memory system provided by an example of the present disclosure may perform the method Operations performed by the memory system in the control method provided by an example of the present disclosure, the details of which may refer to the content of the examples described above and will not be repeated here. The memory system provided by an example of the present disclosure may receive an identifier which is to indicate the peak power capability of the host, and then determine and apply the peak power management policy of the memory system based on the identifier, thereby reaching the full storage performance of the memory system.

An example of the present disclosure also provides a system, which may be the system 100 shown in FIG. 1 above, the system includes a host and a memory system, the host is equipped with a first interface, the memory system includes a memory controller, the memory controller is equipped with a second interface, the host and the memory system are coupled through the first interface and the second interface and implement interaction of information; wherein, the host is configured to send an identifier which is to indicate a peak power capability supported by the host through the first interface. The memory controller is configured to receive the identifier through the second interface and determine a peak power management policy according to the identifier.

In some implementations, the host includes a power management unit, the power management unit is to supply power to the memory system, and the identifier is to indicate the peak power capability supported by the power management unit.

In some implementations, the identifier indicates the magnitude of current that the power management unit is capable of providing to the memory system according to the supported peak power capability.

In some implementations, the current that the power management unit is capable to provide to the memory system according to the supported peak power capability includes at least one of Icc or Iccq.

In some implementations, a default peak power management policy is set in the memory controller. The memory controller is configured to replace the default peak power management policy with the determined peak power management policy after determining the peak power management policy.

In some implementations, the peak power management policy includes parameters that control the running of the memory system.

In some implementations, the parameters include at least one of clock frequency, parallelism of flash memory NAND, and operation latency of an I/O request.

In some implementations, the memory system includes a flash universal storage UFS memory system, and the first interface and the second interface include UFS interfaces.

In some implementations, the identifier is carried in an extended field of the UFS data packet.

In some implementations, the power management unit includes a power management chip PMIC.

In some implementations, the memory controller is further configured to send a response message through the second interface after receiving the identifier, the response message is to indicate that the identifier has been received by the memory controller. The host is further configured to receive the response message through the first interface.

In some implementations, the host is further configured to send an I/O request through the first interface. The memory controller is further configured to receive the I/O request through the second interface and control the memory to process the I/O request according to the determined peak power management policy.

The system provided by an example of the present disclosure including a host and a memory system is capable to implement a control method of the system in the example described above, the details of which may refer to the content of the examples described above and will not be repeated here. In a system provided by an example of the present disclosure, the host may send an identifier corresponding to the supported peak power capability to the memory controller. The memory controller may determine a peak power management policy that matches the peak power capability of the host according to the received identifier, and then process the I/O request according to the determined peak power management policy. Thus, the memory controller is capable to adjust the peak power management policy according to the peak power capability of the host, without limiting the storage performance of the memory system in advance, so that the full performance of the memory system may be utilized.

Figure 7:
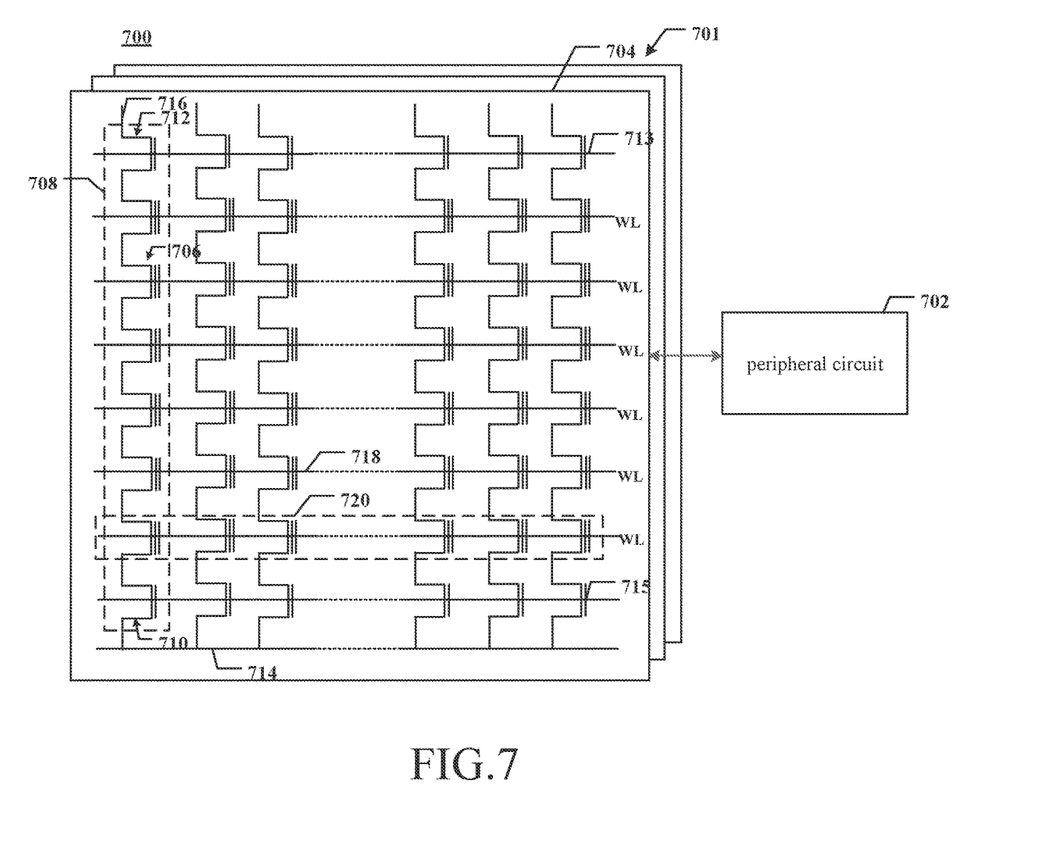
FIG. 7 is a schematic structural diagram of an illustrated memory provided by an example of the present disclosure.

FIG. 7 shows a schematic circuit diagram of an illustrated memory device 700 including peripheral circuit according to some aspects of the present disclosure. The memory 700 may be the memory included in the memory system in the example described above, e.g., the memory shown in FIGS. 1 to 5.

The memory 700 may include a memory cell array device 701 and a peripheral circuit 702 coupled to the memory cell array device 701. The memory cell array device 701 may be a NAND flash memory cell array in which memory cells 706 are provided in an array of NAND memory strings 708, each NAND memory string 708 extending vertically over a substrate (not shown). In some implementations, each NAND memory string 708 includes multiple memory cells 706 coupled in series and stacked vertically. Each memory cell 706 may retain a continuous analog value, e.g., voltage or charge, depending on the number of electrons trapped within the area of the memory cell 706. Each memory cell 706 may be a "floating gate" type memory cell including a floating gate transistor, or a "charge trap" type memory cell including a charge trap transistor.

In some implementations, each memory cell 706 is a single-level cell (SLC) that has two possible memory states and may thus store one bit of data. For example, a first memory state of "O" may correspond to a first voltage range, and a second memory state of "1" may correspond to a second voltage range. In some implementations, each memory cell 706 is a multi-level cell (MLC) capable of storing more than a single bit of data in more than or equal to four memory states. For example, MLCs can store two bits per cell, three bits per cell (also known as triple-level cells (TLC)), or four bits per cell (also known as quad-level cells (QLC)). Each MLC can be programmed to assume a range of possible nominal storage values. In some implementations, if each MLC stores two bits of data, the MLC may be programmed from an erase state to assume one of three possible memory states through writing one of the three possible nominal storage values to the cell, the fourth nominal storage value is available for the erase state.

As shown in FIG. 7, each NAND memory string 708 may include a source select gate (SSG) 710 at its source terminal and a drain select gate (DSG) 712 at its drain terminal. SSG 710 and DSG 712 may be configured to activate selected NAND memory string 708 (columns of the array) during read processing and program processing. In some implementations, sources of NAND memory strings 708 in the same block 704 are coupled through the same source line (SL) 714 (e.g., a common SL). In other words, according to some implementations, all NAND memory strings 708 in the same block 704 have an array common source (ACS). According to some implementations, DSG 712 of each NAND memory string 708 is coupled to a corresponding bit line 716 from which data may be read or written via an output bus (not shown). In some implementations, each NAND memory string 708 is configured to be selected or deselected through at least one of applying a select voltage (e.g., above the threshold voltage of a transistor with a DSG 712) or a deselect voltage (e.g., 0V) to the corresponding DSG 712 via one or more DSG lines 713 or applying a select voltage (e.g., above the threshold voltage of a transistor with a SSG 710) or a deselect voltage (e.g., 0V) to the corresponding SSG 710 via one or more SSG lines 715.

As also shown in FIG. 7, the memory cell array device 701 includes multiple blocks 704, each block 704 including multiple NAND memory strings 708, each of the multiple blocks 704 may have a common source line 714 (e.g., coupled to the ground). In some implementations, each block 704 is the basic data unit for an erase operation, i.e., all memory cells 706 on a same block 704 are erased simultaneously. To erase the memory cell 706 in the selected block 704a, source line 714 coupled to selected block 704a and to unselected blocks 704b in the same plane as selected block 704a may be biased with an erase voltage (Vers) (e.g., a high positive voltage (e.g., 20V or higher)). It should be understood that, in some examples, erase operations may be performed at the half-block level, at the quarter-block level, or at a level with any suitable number of blocks or any suitable fraction of blocks. Memory cells 706 of adjacent NAND memory strings 708 may be coupled through a word line 718 that selects which row of memory cells 706 is affected by read processing and program processing. In some implementations, each word line 718 is coupled to multiple memory cell 706. Each word line 718 may include multiple control gates (gate electrodes) at each memory cell 706 in a corresponding page 720 and a gate line coupling the control gates.

In an example of the present disclosure, a peak power management policy that matches the peak power capabilities supported by different hosts may be set according to the specific types of memory cells included in the memory, so that the power of the memory during operation does not exceed the peak power of the power supply host.

In the present disclosure, the terms "first" and "second" are used for descriptive purposes only, and should not be understood as indicating or implying relative importance. Unless expressly limited otherwise, the term "at least one" refers to one or more, and the term "multiple" refers to two or more.

The above description is only an illustrated example of the application, and is not intended to limit the application, and any modification, equivalent replacement and improvement, etc., made within the spirit and principles of the present disclosure shall be included within the protection scope of the present disclosure.

What is claimed is:

1. A memory system, including:
   a memory device coupled with a host;
   a memory controller comprising a second interface communicated with a first interface of the host, coupled with the memory device and configured to:
   receive, through the second interface from the first interface of the host, an identifier indicating a peak power capability supported by of the host, and
   determine a peak power management policy matches the peak power capability according to the identifier;
   wherein the peak power capability is greater than an operating power of the memory device, and the identifier comprises at least one of:
   a first identifier representing a first current magnitude that a power management unit of the host is capable of providing to the memory device at a first voltage, and
   a second identifier representing a second current magnitude that the power management unit of the host is capable of providing to the memory controller at a second voltage.

2. The memory system of claim 1, wherein the memory controller is further configured to:
   replacing a default peak power management policy preset in the memory controller with the determined peak power management policy.

3. The memory system of claim 2, wherein the memory controller is further configured to:
   in response to determining that the host fails to send the identifier, maintain the default peak power management policy; and in response to failing to determine the peak power management policy matches the peak power capability according to the identifier, maintain the default peak power management policy.

4. The memory system of claim 1, wherein the determined peak power management policy includes one or more parameters of controlling the memory system.

5. The memory system of claim 4, wherein:
   the one or more parameters include at least one of a clock frequency, parallelism of the memory device, and an operation latency of an I/O request.

6. The memory system of claim 1, wherein:
   the memory system includes a flash universal storage (UFS) memory system; and
   each of the first interface and the second interface includes a UFS interface.

7. The memory system of claim 6, wherein the identifier is carried in an extended field of a UFS data packet.

8. The memory system of claim 1, wherein the power management unit includes a power management integrated circuit (PMIC).

9. The memory system of claim 1, wherein the memory controller is further configured to:
   send, through the second interface to the first interface of the host, a response message indicating that the identifier has been received by the memory controller.

10. The memory system of claim 1, wherein the memory controller is further configured to:
    receive, through the second interface from the first interface of the host, an input/output (I/O) request; and
    control the memory device to process the I/O request according to the determined peak power management policy.

11. An electronic device, including:
    a host comprising:
    a power management unit, and
    a first interface configured to send an identifier indicating a peak power capability supported by the power management unit; and
    a memory system comprising:
    a memory device,
    and
    a memory controller comprising a second interface communicated with a first interface of the host, coupled between the memory device and the host, and configured to determine a peak power management policy matches the peak power capability according to the identifier;
    wherein the peak power capability is greater than an operating power of the memory device, and the identifier comprises at least one of:
    a first identifier representing a first current magnitude that a power management unit of the host is capable of providing to the memory device at a first voltage, and
    a second identifier representing a second current magnitude that the power management unit of the host is capable of providing to the memory controller at a second voltage.

12. The electronic device of claim 11, wherein the memory controller is further configured to:
    replacing a default peak power management policy preset in the memory controller with the determined peak power management policy;
    in response to determining that the host fails to send the identifier, maintain the default peak power management policy; and in response to failing to determine the peak power management policy matches the peak power capability according to the identifier, maintain the default peak power management policy.

13. The electronic device of claim 11, wherein:
the determined peak power management policy includes one or more parameters of controlling the memory system; and
the one or more control parameters include at least one of a clock frequency, parallelism of the memory device, and an operation latency of an I/O request.

14. The electronic device of claim 11, wherein:
the memory system includes a flash universal storage (UFS) memory system;
each of the first interface and the second interface includes a UFS interface;
the identifier is carried in an extended field of a UFS data packet; and
the power management unit includes a power management integrated circuit (PMIC).

15. The electronic device of claim 11, wherein the memory controller is further configured to:
send, through the second interface to the first interface of the host, a response message indicating that the identifier has been received by the memory controller;
receive, through the second interface from the first interface of the host, an input/output (I/O) request; and
control the memory device to process the I/O request according to the determined peak power management policy.

16. A power controlling method, comprising:
sending, through a first interface of a host, an identifier indicating a peak power capability supported by the host;
receiving, by a second interface in a memory controller of a memory system communicated with the first interface, the identifier;
determining, by the memory controller, a peak power management policy matches the peak power capability according to the identifier; and
applying, by the memory controller, the peak power management policy to control the memory system;
wherein the peak power capability is greater than an operating power of a memory device in the memory system, and
the identifier comprises at least one of:
a first identifier representing a first current magnitude that a power management unit of the host is capable of providing to the memory device at a first voltage, and
a second identifier representing a second current magnitude that the power management unit of the host is capable of providing to the memory controller at a second voltage.

17. The method of claim 16, further comprising:
replacing, by the memory controller, a default peak power management policy with the determined peak power management policy.

18. The method of claim 16, further comprising:
in response to determining that the host fails to send the identifier, maintaining a default peak power management policy; and
in response to failing to determine the peak power management policy matches the peak power capability according to the identifier, maintaining the default peak power management policy.

19. The method of claim 16, wherein:
determining the peak power management policy includes determining one or more parameters of a clock frequency, parallelism of the memory device, and an operation latency of an I/O request.

20. The method of claim 16, further comprising:
sending, through the second interface to the first interface of the host, a response message indicating that the identifier has been received by the memory controller.

* * * * *